United States Patent
Nagao et al.

(10) Patent No.: US 7,593,175 B2
(45) Date of Patent: Sep. 22, 2009

(54) MAGNETIC TRANSFER METHOD, MAGNETIC TRANSFER APPARATUS, MAGNETIC RECORDING MEDIUM AND MAGNETIC RECORD REPRODUCTION SYSTEM

(75) Inventors: Makoto Nagao, Odawara (JP); Naoto Fujiwara, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 317 days.

(21) Appl. No.: 11/761,052

(22) Filed: Jun. 11, 2007

(65) Prior Publication Data

US 2007/0291387 A1    Dec. 20, 2007

(30) Foreign Application Priority Data

Jun. 15, 2006    (JP)    ............................ 2006-166109

(51) Int. Cl.
*G11B 5/86*    (2006.01)
(52) U.S. Cl. ..................................... 360/17
(58) Field of Classification Search .............. 360/17, 360/16, 48, 62
See application file for complete search history.

(56) References Cited

U.S. PATENT DOCUMENTS

| | | | |
|---|---|---|---|
| 7,057,834 B2 | 6/2006 | Ishida et al. | |
| 7,061,703 B2 | 6/2006 | Ishida et al. | |
| 7,119,973 B2 * | 10/2006 | Kamatani | 360/17 |
| 7,170,698 B2 * | 1/2007 | Kamatani | 360/17 |
| 7,502,184 B2 * | 3/2009 | Niitsuma et al. | 360/17 |
| 2002/0159173 A1 | 10/2002 | Ishida et al. | |
| 2003/0184896 A1 | 10/2003 | Ishida et al. | |
| 2004/0040668 A1 * | 3/2004 | Kamatani | 156/540 |
| 2004/0257687 A1 | 12/2004 | Ishida et al. | |

FOREIGN PATENT DOCUMENTS

| | | |
|---|---|---|
| EP | 0915456 A1 | 5/1999 |
| JP | 10-40544 A | 2/1998 |
| JP | 2001-297433 A | 10/2001 |
| WO | 01-75869 A1 | 10/2001 |

* cited by examiner

*Primary Examiner*—Fred Tzeng
(74) *Attorney, Agent, or Firm*—Sughrue Mion, PLLC (57)    ABSTRACT

A magnetic transfer method comprises the processes of: adhering a side having a perpendicular magnetic recording layer of a perpendicular magnetic recording medium in which a perpendicular magnetic recording layer is formed on a surface of a disk shaped substrate, to a surface of a master recording medium in which a magnetic layer is formed corresponding to information to be recorded for transferring information to the perpendicular magnetic recording medium and of the side having the magnetic layer formed; and performing magnetic transfer by relatively rotating a magnetic field application device about the center of the perpendicular magnetic recording medium as an axis with respect to the perpendicular magnetic recording medium and the master recording medium, while applying a magnetic field to the perpendicular magnetic recording medium and the master recording medium by the magnetic field application device, wherein the magnetic field application device is rotated two or more times.

17 Claims, 9 Drawing Sheets

MAGNETIC TRANSFER METHOD, MAGNETIC TRANSFER APPARATUS, MAGNETIC RECORDING MEDIUM AND MAGNETIC RECORD REPRODUCTION SYSTEM

BACKGROUND OF THE INVENTION

1. Field of the Invention

The present invention relates to a magnetic transfer method, a magnetic transfer apparatus, a magnetic recording medium and a magnetic record/reproduction system, and in particular to a magnetic transfer method, a magnetic transfer apparatus, a magnetic recording medium and a magnetic record/reproduction system suitable for transferring a magnetic information pattern such as format information from a master disk to a magnetic transfer disk having a magnetic layer formed of a perpendicular magnetization film.

2. Description of the Related Art

Recently, a magnetic record reproduction system, in order to realize miniaturization and high volume, tends to be higher in recording density. In particular, in the field of hard disk drives which are representative magnetic recording systems, technologies are advancing rapidly.

An approach to increase in such recording density includes manufacturing a magnetoresistive element head (MR head) for a magnetic head, which allows a pitch of tracks in magnetic recording medium to be narrower, and therefore, in order to allow the magnetic head to accurately scan a narrow track to provide a higher S/N of a regenerative signal, a tracking servo technology of the magnetic head becomes important. Then, a current hard disk drive is provided with an area in which a servo signal for tracking, address information, a regenerative clock signal and the like are recorded in advance at regular, angular intervals on a disk thereof, and then the magnetic head can accurately track by confirming and correcting a position of the head while reproducing these signals.

Recording the servo signal for tracking or the address signal etc. in advance is called "preformat recording", and generally is performed at the beginning because it is a reference when information is recorded or reproduced on a magnetic recording medium. At present, the preformat recording is performed sequentially by accurately controlling the position and therefore it takes a lot of time, and also, because a dedicated servo recording apparatus is considerably expensive, a problem arises that costs of a magnetic recording medium or a magnetic record reproduction system are very high.

Then, a magnetic transfer system for this preformat recording is proposed in that the signals are transferred in batch using a master disk. This system can carry out the preformat recording in a short time and at a low cost.

In this magnetic transfer system, the preformat recording is performed in a manner that information (for example, information of a servo signal for tracking etc.) recorded on a master disk (master recording medium) is transferred by applying a magnetic field for transfer to one side or both sides, with the master disk adhered to a magnetic transfer disk (magnetic recording medium, slave disk), using a magnetic field application device such as an electromagnetic device or a permanent magnet device.

Further, a technique to increase recording density of a magnetic recording medium includes a perpendicular magnetic recording system. The perpendicular magnetic recording, compared to a conventional case of recording by using an in-plane magnetization film for magnetic layer, is improved in recording density, but it has a different record reproduction system. Therefore, as described above, when the preformat recording is performed in batch by the magnetic transfer system, a different system from the case of using the in-plane magnetization film is used.

Japanese Patent Application Laid-Open No. H10-40544 discloses the invention that, when preformatted information is recorded by perpendicular magnetic recording on a magnetic transfer disk having a magnetic recording layer composed of a perpendicular magnetization film, the preformatted information is transferred and recorded by vertically applying a magnetic field to the magnetic transfer disk and the master disk.

Japanese Patent Application Laid-Open No. 2001-297433 discloses the invention that, when preformatted information is recorded by perpendicular magnetic recording on a magnetic transfer disk having a magnetic recording layer composed of a perpendicular magnetization film, the preformatted information is transferred and recorded by applying a magnetic field parallel to the magnetic transfer disk and a master disk.

SUMMARY OF THE INVENTION

Now, the present inventors found that, when the present inventors studied the method for transferring information from the master disk to the magnetic transfer disk and recording using above-mentioned method, there was correlation between the magnetic field transfer method and reproduction characteristics of recorded information.

The present invention was made from the result of studies by the present inventors to study relationship between the magnetic transfer method described above and reproduction characteristics of recorded information on the magnetic transfer disk, and an object thereof is to provide a magnetic transfer method, a magnetic transfer apparatus, a magnetic recording medium and a magnetic record reproduction system for enhancing an output of a reproduction signal.

A first aspect of the present invention is a magnetic transfer method including: an adhesion process which adheres a side having a perpendicular magnetic recording layer of a perpendicular magnetic recording medium in which a perpendicular magnetic recording layer is formed on a surface of a disk shaped substrate, to a surface of a master recording medium in which a magnetic layer is formed corresponding to information to be recorded for transferring information to the perpendicular magnetic recording medium and of the side having the magnetic layer formed: and a magnetic transfer process which performs magnetic transfer by relatively rotating a magnetic field application device about the center of the perpendicular magnetic recording medium as an axis with respect to the perpendicular magnetic recording medium and the master recording medium adhered with each other, while applying a magnetic field to the perpendicular magnetic recording medium and the master recording medium adhered with each other by the magnetic field application device which applies the magnetic field, wherein the magnetic field application device is relatively rotated two or more times with respect to the perpendicular magnetic recording medium and the master recording medium adhered with each other.

The rotation of two or more times allows a good regenerative signal to be obtained, when the perpendicular magnetic recording medium is reproduced.

A second aspect of the present invention is a magnetic transfer method including: an initial magnetization process which vertically magnetizes, in the same direction, a perpendicular magnetic recording medium in which a perpendicular magnetic recording layer is formed on a surface of a disk substrate: an adhesion process which adheres a surface of the perpendicular magnetic recording medium initially magnetized by the initial magnetization process and of the side having the perpendicular magnetic recording layer formed, to a surface of a master recording medium in which a magnetic layer is formed corresponding to information to be recorded for transferring information to the perpendicular magnetic recording medium and of the side having the magnetic layer formed: and a magnetic transfer process which performs magnetic transfer by relatively rotating a magnetic field application device about the center of the perpendicular magnetic recording medium as an axis with respect to the perpendicular magnetic recording medium and the master recording medium adhered with each other, while applying a magnetic field to the perpendicular magnetic recording medium and the master recording medium adhered with each other by the magnetic field application device which applies the magnetic field, wherein the magnetic field application device is relatively rotated two or more times with respect to the perpendicular magnetic recording medium and the master recording medium adhered with each other.

The rotation of two or more times allows a good reproduction signal to be obtained, when the perpendicular magnetic recording medium is played-back.

A third aspect of the present invention is the magnetic transfer method according to the first or second aspect of the present invention, wherein the master recording medium has a magnetic layer formed on a substrate composed of nonmagnetic material.

According to the aforementioned, the magnetic transfer process can be performed efficiently with a higher yield rate.

A fourth aspect of the present invention is the magnetic transfer method according to any one of the first to third aspects of the present invention, wherein, in the master recording medium, an area where the magnetic layer is formed has a projecting shape.

A fifth aspect of the present invention is the magnetic transfer method according to any one of the first to fourth aspects of the present invention, wherein, when a magnetic field is applied to the perpendicular magnetic recording medium and the master recording medium adhered with each other by the magnetic field application device, the magnetic field application device is disposed on the side of the master recording medium and applies the magnetic field from the side of the master recording medium.

According to this, the magnetic transfer process can be performed efficiently with a higher yield rate.

A sixth aspect of the present invention is the magnetic transfer method according to any one of the first to fifth aspects of the present invention, wherein the number of rotation is three when the magnetic field application device is relatively rotated, while the magnetic field is applied by the magnetic field application device, with respect to the perpendicular magnetic recording medium and the master recording medium adhered with each other.

According to this, the magnetic transfer process can be performed with a higher throughput and a higher yield rate.

A seventh aspect of the present invention is the magnetic transfer method according to any one of the first to sixth aspects of the present invention, wherein information to be transferred from the master recording medium to the perpendicular magnetic recording medium is of a servo signal.

According to this, tracking can be securely performed even if a track is narrow.

An eighth aspect of the present invention is a perpendicular magnetic recording medium wherein magnetic transfer is performed by the magnetic transfer method according to any one of the first to seventh aspects of the present invention.

A ninth aspect of the present invention is a magnetic transfer apparatus in which magnetic transfer is performed by adhering a surface of a perpendicular magnetic recording medium in which a perpendicular magnetic recording layer is formed on a surface of a disk substrate and of the side having the perpendicular magnetic recording layer formed, to a surface of a master recording medium in which a magnetic layer is formed corresponding to information to be recorded for transferring information to the perpendicular magnetic recording medium and of the side having the magnetic layer formed, and by relatively rotating a magnetic field application device about the center of the perpendicular magnetic recording medium as an axis with respect to the perpendicular magnetic recording medium and the master recording medium adhered with each other, while applying a magnetic field to the perpendicular magnetic recording medium and the master recording medium adhered with each other by the magnetic field application device which applies the magnetic field, wherein the magnetic transfer apparatus has a rotating device which relatively rotates the magnetic field application device two or more times with respect to the perpendicular magnetic recording medium and the master recording medium adhered with each other.

This allows for manufacturing of the perpendicular magnetic recording medium in which securing of tracking can be provided even if a track is narrow.

A tenth aspect of the present invention is a magnetic recording system wherein the magnetic recording system includes the perpendicular magnetic recording medium in which magnetic transfer is performed by the magnetic transfer method according to any one of the first to seventh aspects of the present invention.

This can provide the magnetic recording system having a higher density.

As described above, the magnetic transfer performed by the magnetic transfer method and the magnetic transfer apparatus according to the present invention can improve an output of the regenerative signal recorded on the magnetic transfer disk. Further, because an output of a tracking signal is sufficient in the magnetic recording medium and the magnetic record reproduction system manufactured according to this, an advantage of accurate recording and reproduction of information, even if a track is narrow, can be provided.

DETAILED DESCRIPTION OF THE PREFERRED EMBODIMENTS

Now, a magnetic transfer method according to a first embodiment of the present invention will be described with reference to the accompanying drawings.

[Magnetic Transfer Disk]

Figure 1A:
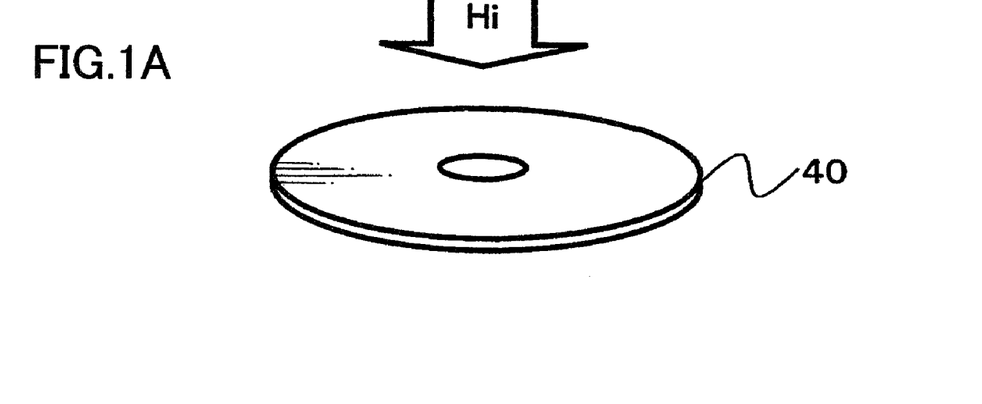
FIGS. 1A to 1C are schematic views illustrating processes for a magnetic transfer method according to a first embodiment of the present invention.

As shown in FIG. 1A, first, a magnetic transfer disk 40, which is a magnetic recording medium, is initially magnetized. Then, the magnetic transfer disk 40 used for this will be described.

The magnetic transfer disk 40 has a magnetic layer composed of a perpendicular magnetization film formed on one or both surfaces of a disk substrate, and includes a high-density hard disk.

The disk substrate is composed of material such as glass and Al (aluminum), and after a nonmagnetic layer is formed on this substrate, the magnetic layer is formed.

The nonmagnetic layer is provided for a reason such as enhancement of perpendicular magnetic anisotropy of the magnetic layer formed later. Material used for the nonmagnetic layer preferably includes Ti (titanium), Cr (chromium), CrTi, CoCr, CrTa, CrMo, NiAl, Ru (ruthenium), Pd (Palladium). The nonmagnetic layer is formed by depositing the material described above using the sputtering technique. The nonmagnetic layer has preferably a thickness of 10 nm to 150 nm, and more preferably 20 nm to 80 nm.

The magnetic layer is composed of the perpendicular magnetization film, and information is recorded on the magnetic layer. Material used for the magnetic layer preferably includes Co (cobalt), Co alloy (CoPtCr, CoCr, CoPtCr, Ta, CoPtCrNbTa, CoCrB, CoNi, CoSm etc.), Fe and Fe alloy (FeCo, FePt, FeCoNi etc.). It is preferable to add oxygen, $SiO_2$ or the like to the material described above, because it can provide good magnetic characteristics without heating the substrate upon formation of the magnetic layer. Because these materials have large magnetic flux density and perpendicular magnetic anisotropy, these can increase recording density of the magnetic recording medium and is also excellent in transfer characteristics. The magnetic layer is formed by depositing the material described above using the sputtering technique. The magnetic layer has preferably a thickness of 10 nm to 500 nm, and more preferably 20 nm to 200 nm.

In addition, as required, a soft magnetic layer may be provided between the substrate and the nonmagnetic layer. It is because perpendicular magnetized state of the magnetic layer is stabilized and sensitivity upon recording and reproduction is improved. The soft magnetic layer has preferably a thickness of 50 nm to 2,000 nm, and more preferably 80 nm to 400 nm.

Specifically, in the present embodiment, a disk shape glass substrate with an outer diameter of 95 mm (3.5 in) is used for the substrate of the magnetic transfer disk. The glass substrate is placed in a chamber of a sputtering device, and after decreasing the pressure to $1.33\times10^{-5}$ Pa ($1.0\times10^{-7}$ Torr), Ar (argon) gas is introduced into the chamber and a film is deposited by the sputtering technique by discharge using a Ru target. At this time, a substrate temperature is the room temperature. Thus, the nonmagnetic layer is formed of Ru with a thickness of 60 nm.

Subsequently, Ar gas is introduced similarly to the above manner, and a film is deposited by the sputtering technique by discharge using a CoCrPt—$SiO_2$ target present in the same chamber. At this time, a substrate temperature is the room temperature. Thus, the magnetic layer is formed of CoCrPt—$SiO_2$ with a thickness of 25 nm.

According to the processes described above, the magnetic transfer disk having the nonmagnetic layer and the magnetic layer formed on the glass substrate is provided.

The magnetic transfer disk 40 manufactured in this way has saturated magnetization Ms of $6\times10^5$ [A/m] [600 (emu/cc)] and coercive force Hc of 199 kA/m (2,500 Oe).

As described above, one example of the magnetic transfer disk has been described.

[Initial Magnetization of Magnetic Transfer Disk]

Figure 4A:
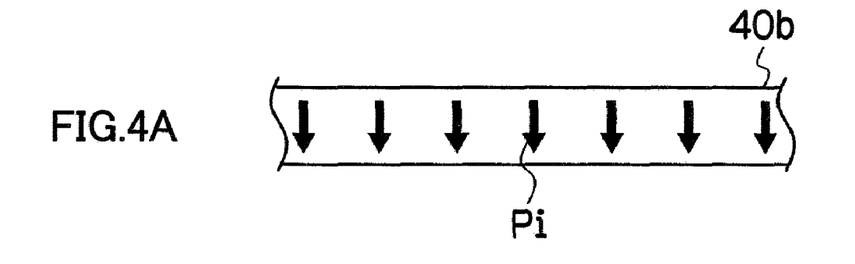
FIGS. 4A to 4C are explanatory drawings illustrating the processes for the magnetic transfer method according to the first embodiment of the present invention.

Next, as shown in FIG. 1A, the magnetic transfer disk 40 formed is initially magnetized. The initial magnetization Hi is carried out by applying a magnetic field to a disk surface of the magnetic transfer disk 40 in the vertical direction thereof. Specifically, this application of the magnetic field in the vertical direction is performed by generating the magnetic field in the vertical direction to the disk surface using a permanent magnet or an electromagnet and applying this to the magnetic transfer disk to magnetize the magnetic layer in the same, perpendicular magnetized direction. Thus, as shown in FIG. 4A, the magnetic layer 40b of the magnetic transfer disk 40 is perpendicularly magnetized in one direction.

Magnetic field strength of the initial magnetization Hi applied at this time is adjusted to be not smaller than 207 kA/m (2,600 Oe) on the surface of the magnetic transfer disk and then applied.

In addition, this initial magnetization is not necessarily required in edge printing in which an in-plane magnetic field is applied upon magnetic transfer described in the present embodiment, but from the view point of reproducibility and the like, it is suitable to perform the initial magnetization. Further, in bit print in which a perpendicular magnetic field is applied upon magnetic transfer, this initial magnetization is an essential process.

[Master Disk]

Next, a master disk will be described.

Figure 2:
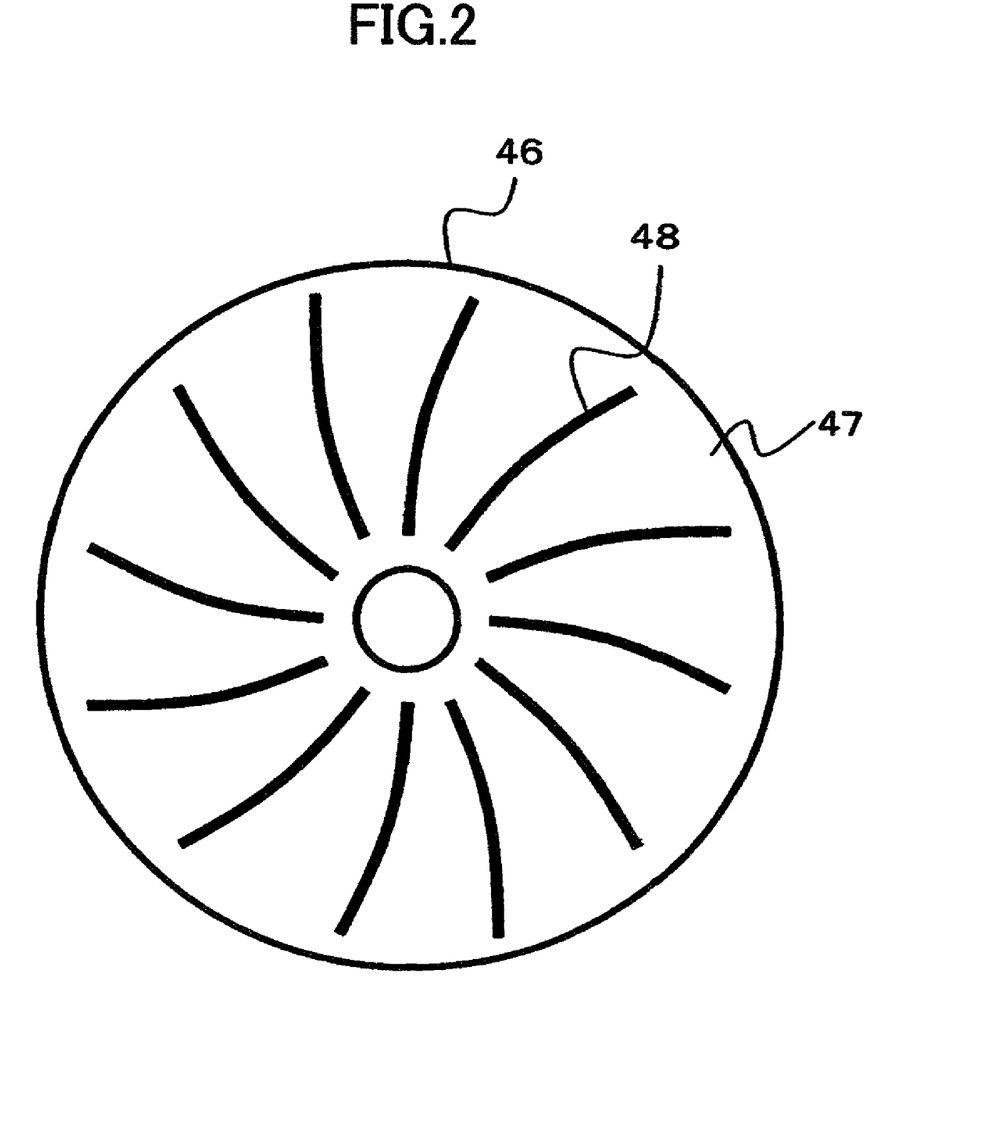
FIG. 2 is a plan view of a master disk according to the present invention.

A master disk 46, as shown in FIG. 2, is provided by forming a magnetic layer 48 on a substrate 47 composed of nonmagnetic material such as glass having various composition such as quartz glass ($SiO_2$), ceramics having various composition or synthetic resin, and it is used in an adhesion process which adheres the master disk to the magnetic transfer disk 40 initially magnetized, and subsequently in a magnetic transfer process.

A method for forming the master disk 46 is the photofabrication method, the stamper method using an original disk manufactured by the photofabrication method or the like.

Now, the stamper method will be described hereinafter. The stamper method uses a press original disk, and so manufacturing processes for this press original disk will be described. A photoresist layer is coated by a spin coat method etc. on a circular substrate having a flat and smooth surface composed of glass or quartz glass, and after pre-baking, the photoresist layer is irradiated with a laser beam (or an electron beam) modulated corresponding to a signal to be recorded, while rotating this circular substrate, forming a predetermined pattern on almost the entire surface of the photoresist layer.

For example, in the case of recording a servo signal, a pattern extending in line from the rotation center radially corresponding to the servo signal is exposed in each track. Subsequently, the exposed substrate is immersed in developing solution to remove the exposed portion of the photoresist layer, and thereby, a glass original disk on which the photoresist layer is formed on the predetermined area of the glass substrate is manufactured. Ni is plated (electroforming) on a surface of this glass original disk and of the side having the photoresist layer formed, and thereby forming an Ni original disk having a positive, concavo-convex pattern on a surface thereof with a predetermined thickness, and this Ni original disk is peeled off from the glass original disk. Although this Ni original disk may be used as a press original disk (mold) for the stamper method, a soft magnetic layer, a protective layer or the like, as required, are coated on the concavo-convex pattern of this Ni original disk, providing the press original disk (mold) for the stamper method. It is because formation of the soft magnetic layer, protective layer or the like in this way can improve magnetic characteristics of the magnetic transfer disk subsequently manufactured.

In addition, after developing, the surface of the glass original disk having the photoresist layer formed on the predetermined area may be plated to manufacture a second original disk, and a surface of the second original disk is further Ni-plated to manufacture an Ni original disk having a negative concavo-convex pattern. Further, by plating the surface of the second original disk, or by pressing resin of a low viscosity to it to cure, a third original disk may be manufactured, and by applying nickel plating to a surface of the third original disk, an Ni original disk having a positive concavo-convex pattern may be manufactured.

Material constituting the Ni original disk mainly used includes Ni and Ni alloy. As a method for forming this Ni original disk, aside from the plating method such as the electrolytic and electroless plating methods described previously, a vacuum forming method such as the sputtering method and the ion plating method can be used. In addition, the resist coated on the substrate may be positive type or negative type to use, and so it has to be noted that the exposed pattern of the positive and negative type is reversed to each other.

Next, using the Ni original disk formed in this way as the press original disk, a resin substrate 47 is manufactured by injection molding etc., and on a surface thereof, a magnetic layer 48 is formed. Resin material of the resin substrate 47 includes acrylic resin such as polycarbonate and polymethyl methacrylate, vinyl chloride resin such as polyvinyl chloride and vinyl chloride copolymer, epoxy resin, amorphous polyolefin, and polyester. Among these resin materials, from the view points of moisture resistance, dimensional stability and cost, at the present time of writing, polycarbonate is preferable.

In the case where the resin substrate 47 is formed by the injection molding, a burr or the like may be produced on the resin substrate 47 which is a molded article, but such burr or the like is removed by a burnisher or polishing.

A method for forming the resin substrate 47, other than the injection molding, may also include a method using ultraviolet curing resin, electron beam curing resin or the like. In this case, after the ultraviolet curing resin or electron beam curing resin is coated on the press original disk by a method of spin coat or bar coat, it is irradiated with an ultraviolet ray or electron beam to cure, and subsequently it is peeled off from the press original disk to provide the resin substrate 47.

Next, a method for manufacturing the master disk 46 will be described with reference to FIGS. 3A to 3E.

Figure 3A:
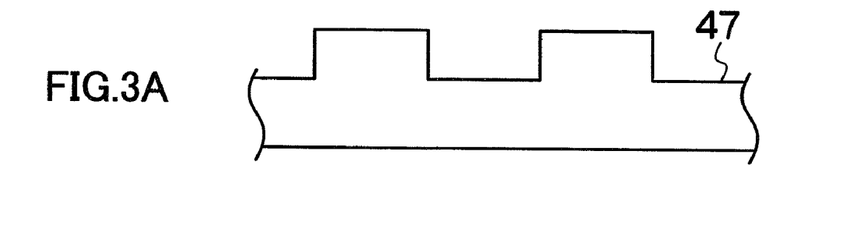
FIGS. 3A to 3E are process drawings illustrating a formation method of a master disk according to the first embodiment of the present invention.

FIG. 3A shows the resin substrate 47 manufactured according to the processes described above. As shown in FIG. 3A, on the surface of the resin substrate, a projecting pattern is provided.

In the present embodiment, the projecting pattern has a pattern of a length of 80 mm and 200 mm formed, and a height (depth) of the projecting pattern to be formed is preferably in the range of 20 nm to 300 nm, and more preferably 30 nm to 200 nm.

Figure 3B:
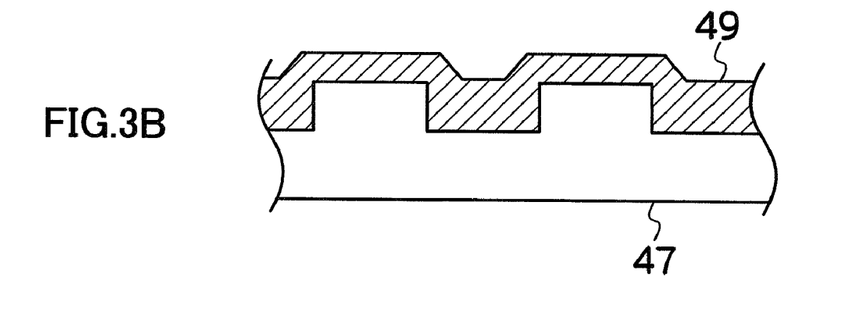

Subsequently, as shown in FIG. 3B, on a surface of the resin substrate 47 formed and of the side having the projecting pattern formed, a photoresist 49 is coated by a spin coater etc. to be cured. Specifically, in the case that the photoresist 49 is a negative photoresist, an ultraviolet ray is projected to polymerize. On the contrary, in the case of a positive photoresist, a baking process is performed to polymerize. Because the photoresist 49 is uniformly spread in the case of using the spin coater etc., it is formed thin in a convex portion which is the projecting pattern on the surface of the resin substrate 47, and thick in a concave portion except the convex portion.

Figure 3C:
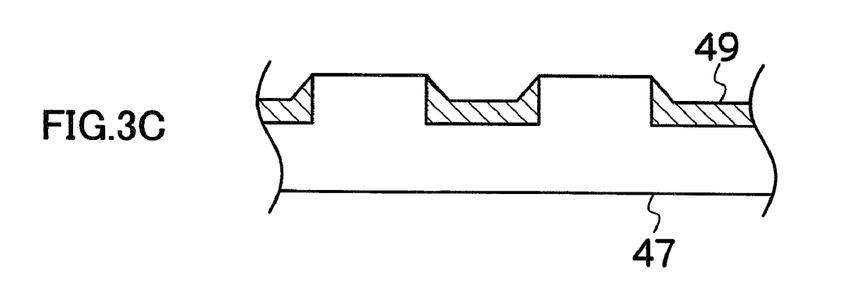

Subsequently, as shown in FIG. 3C, a part of the photoresist 49 is removed by ashing with oxygen introduced. Specifically, the ashing is brought to a stop upon exposure of the surface of the projecting pattern of the resin substrate 47. In the ashing, because the photoresist 49 is removed uniformly in the depth direction and the photoresist 49 is formed thick in the concave portion, the photoresist 49 in this region is left behind, even if the surface of the convex portion of the projecting pattern of the resin substrate 47 is exposed.

Figure 3D:
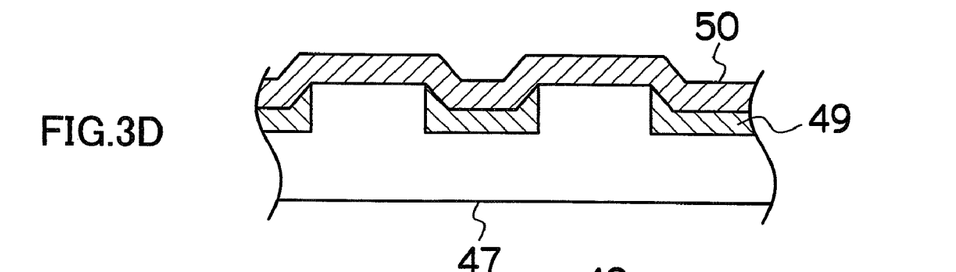

Subsequently, as shown in FIG. 3D, a magnetic film 50 is formed of soft magnetic material. Material constituting the magnetic film 50 includes preferably soft magnetic material having coercive force Hc which is not greater than 48 kA/m (<600 Oe). Specifically, it may include Co, Co alloy (CoNi, CoNiZr, CoNbTaZr etc.), Fe, Fe alloy (FeCo, FeCoNi, FeNiMo, FeAlSi, FeAl, FeTaN), Ni and Ni alloy (NiFe). From the view point of magnetic characteristics, FeCo and FeCoNi are especially preferable. Further, a thickness of the magnetic film 50 is preferably in the range of 20 nm to 300 nm, and especially more preferable in the range of 30 nm to 200 nm. The magnetic film 50 is provided by sputtering etc. using a target of the material described above.

Figure 3E:
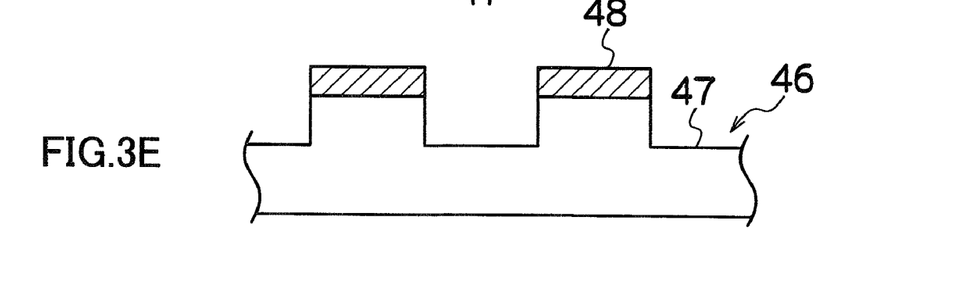

Subsequently, as shown in FIG. 3E, the magnetic film formed on the photoresist 49 is removed by a liftoff technology. Specifically, the substrate 47 having the magnetic film 50 formed thereon is immersed in organic solution etc., and thereby, the magnetic film 50 formed on the photoresist 49 is removed together with the photoresist 49.

According to the processes described above, the master disk 46 is finished in which the magnetic layer 48 is formed radially on an upper surface of the projecting pattern of the substrate 47 as shown in FIG. 2 and information of the servo signal etc. is recorded.

In addition, a protective film of diamond-like carbon etc. on the magnetic layer 48 and further a lubricant agent layer on the protective film may be provided. As described hereinafter, because the master disk 46 is adhered to the magnetic transfer disk 40, the surface of the master disk 46 on which the magnetic layer 48 is formed becomes an adhering surface. Therefore, the protective film and lubricant agent layer are provided in order to prevent the magnetic layer 48 from being damaged upon adhesion and unable to be used as a master disk 46. Further, the lubricant agent layer has an advantage of preventing a scratch from being produced from friction generated upon contact with the magnetic transfer disk 40 and therefore improving durability.

Specifically, for the protective film, preferably, a diamond-like carbon film having a thickness of 2 to 30 nm is formed, and further, on the carbon film, the lubricant agent layer is formed. Also, in order to enhance adhesion between the magnetic layer 48 and the protective film, an adhesion enhancing layer of Si etc. may be formed on the magnetic layer 48 and subsequently, the protective film may be formed.

[Adhesion Process]

Figure 1B:
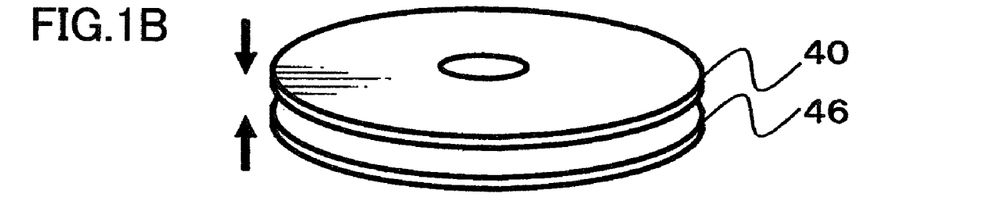

Next, as shown in FIG. 1B, in an adhesion process, the surface of the master disk 46 manufactured according to the processes described above on which the projecting pattern is formed, and the surface of the magnetic transfer disk 40 on which the magnetic layer 40b is formed are adhered to one another by a predetermined press force.

A cleaning process (burnishing process etc.) which removes a small projection or an adhered dust article on the surface using a glide head or polishing body etc., as required, is reformed to the magnetic transfer disk 40 before it is adhered to the master disk 46.

In addition, in the adhesion process, as shown in FIG. 1B, there may be the case where the master disk 46 is adhered to one of surfaces of the magnetic transfer disk 40, or the master disks 46 are adhered to both of surfaces of the magnetic transfer disk 40 having the magnetic layers formed on both surfaces. In the latter case, there is an advantage of concurrent transfer to both surfaces.

[Magnetic Transfer Process]

Figure 1C:
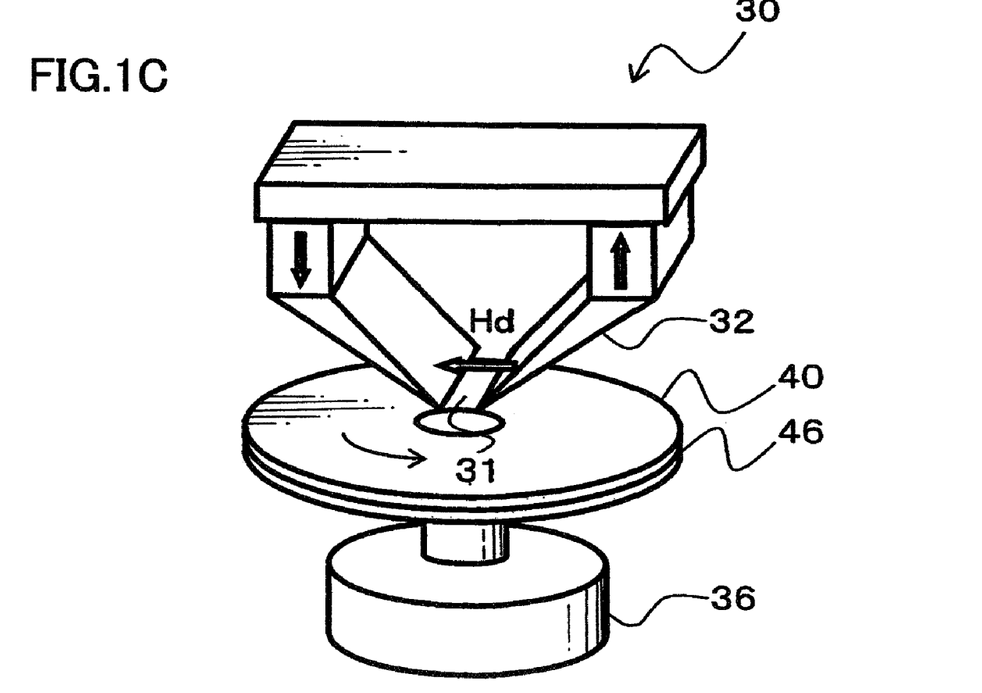

Next, a magnetic transfer process will be described with reference to FIG. 1C.

A magnetic field is applied to the magnetic transfer disk 40 and the master disk 46 adhered to each other according to the adhesion process described above, by a magnetic field application device 30. Magnetic flux is produced thereby in the direction as designated by an arrow in a core 32, and magnetic flux of a recording magnetic field Hd leaking from a gap 31 enters the magnetic transfer disk 40 and the master disk 46, providing magnetic transfer.

A magnetic transfer apparatus 10, where the magnetic field application device 30 is composed of a coil not shown, wound around the core 32, and configured so that a magnetic field is produced across the gap 31 by making electric amount to flow through the coil. The direction of the magnetic field produced is changeable depending on the direction of the electric current flowing in the coil. In the present embodiment, the magnetic field can be applied parallel to the master disk 46 and the magnetic transfer disk 40.

The magnetic transfer is performed by applying the magnetic field for transfer using the magnetic field application device 30 while rotating the magnetic transfer disk 40 and the master disk 46 adhered to each other, and therefore a rotating device 36 is provided. In addition, the rotating device 36 may have a configuration in which a mechanism is provided to relatively rotate the magnetic field application device 30 with respect to the magnetic transfer disk 40 and the master disk 46, other than this configuration.

Figure 4B:
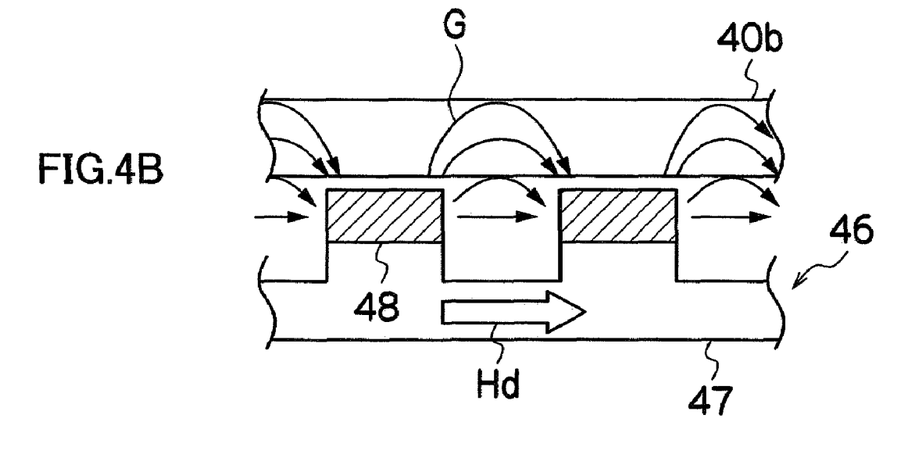
Figure 4C:
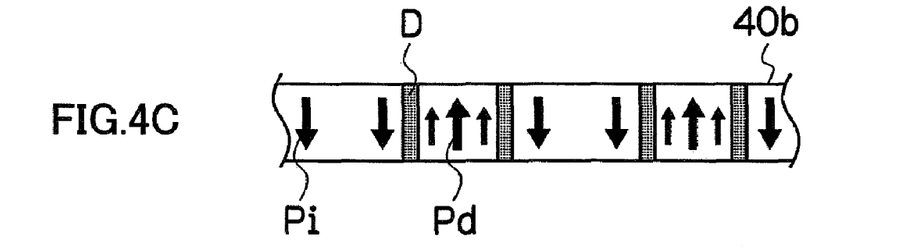

FIGS. 4A to 4C show a state in that information is recorded on the magnetic layer 40b of the magnetic transfer disk 40. FIG. 4A shows the magnetic transfer disk 40 after initialization by the initial magnetization process, and the magnetic layer 40b is initially magnetized in one direction Pi.

FIG. 4B shows a state in that the recording magnetic field Hd is applied parallel to the disk surfaces of the master disk 46 and the magnetic transfer disk 40. In an area where the magnetic layer 48 of the master disk 46 is provided, a leakage magnetic field is produced from the magnetic layer 48 by applying the recording magnetic field Hd by the magnetic field application device 30, generating magnetic flux G. This magnetic flux G, in an edge portion of the magnetic layer 48, is substantially perpendicular to the magnetic layer 40b of the magnetic transfer disk 40. According to this, the magnetization direction of the magnetic transfer disk 40 is reversed, so that information is recorded. That is, the magnetic layer 40b of the magnetic transfer disk 40 in advance is initially magnetized Pi downward as shown in FIG. 4A. Then, application of the recording magnetic field Hd to this, in a front portion of the magnetic layer 48 of the master disk 46 in the application direction of the magnetic field, produces the leakage magnetic flux G from the edge portion of the magnetic layer 48 upward in the approximately perpendicular direction, and therefore the magnetization direction of the magnetic layer 40b of the magnetic transfer disk 40 is reversed, and accordingly, recording magnetization Pd made to be upward holds information to be recorded.

In addition, in a central portion of the area where the magnetic layer 48 of the master disk 46 is formed, most magnetic flux passes through the magnetic layer 48 and hardly leaks to outside, and therefore, it scarcely affects the magnetization direction of the magnetic layer 40b of the magnetic transfer disk 40 in this area. Accordingly, the magnetization direction of the magnetic layer 40b of the magnetic transfer disk 40 still remains in the initial magnetization direction Pi. Further, in a back portion of the magnetic layer 48 of the master disk 46 in the application direction of the magnetic field, the magnetic flux G leaking from the edge portion of the magnetic layer 48 is produced downwardly in the approximately perpendicular direction. This direction is the same direction of the initial magnetization direction Pi, and therefore the magnetization direction in this area still remains in the initial magnetization direction Pi.

Further, in a central portion of the area where the magnetic layer 48 of the master disk 46 is not formed, the magnetic flux G leaking from the magnetic layer 48 is approximately parallel to the magnetic layer 40b of the magnetic transfer disk 40, and the flux density in this area is nondense and the magnetic field is also weak, and therefore, the magnetization direction is not affected, and because the magnetic layer 40b of the magnetic transfer disk 40 is the perpendicular magnetization film, it, also, is not likely to be affected by the in-plane magnetic field and remains in the initial magnetization direction Pi. Accordingly, in FIG. 4B, in the edge portion of the magnetic layer 40b in front of the magnetic layer 48 of the master disk 46 in the application direction of the magnetic field, information is transferred correspondingly to the magnetization direction of the perpendicular magnetism, to the magnetic layer 40b of the magnetic transfer disk 40.

FIG. 4C shows a state of the magnetic layer 40b of the magnetic transfer disk 40 to which the information is transferred according to the processes described above. As shown in FIG. 4C, in the magnetic layer 40b of the magnetic transfer disk 40, there are formed the area which remains in the magnetization Pi as initially magnetized, and the area where the information is transferred from the master disk 46 and the magnetization direction is reversed into the state of the magnetization Pd.

[Transfer Characteristics]

Figure 5:
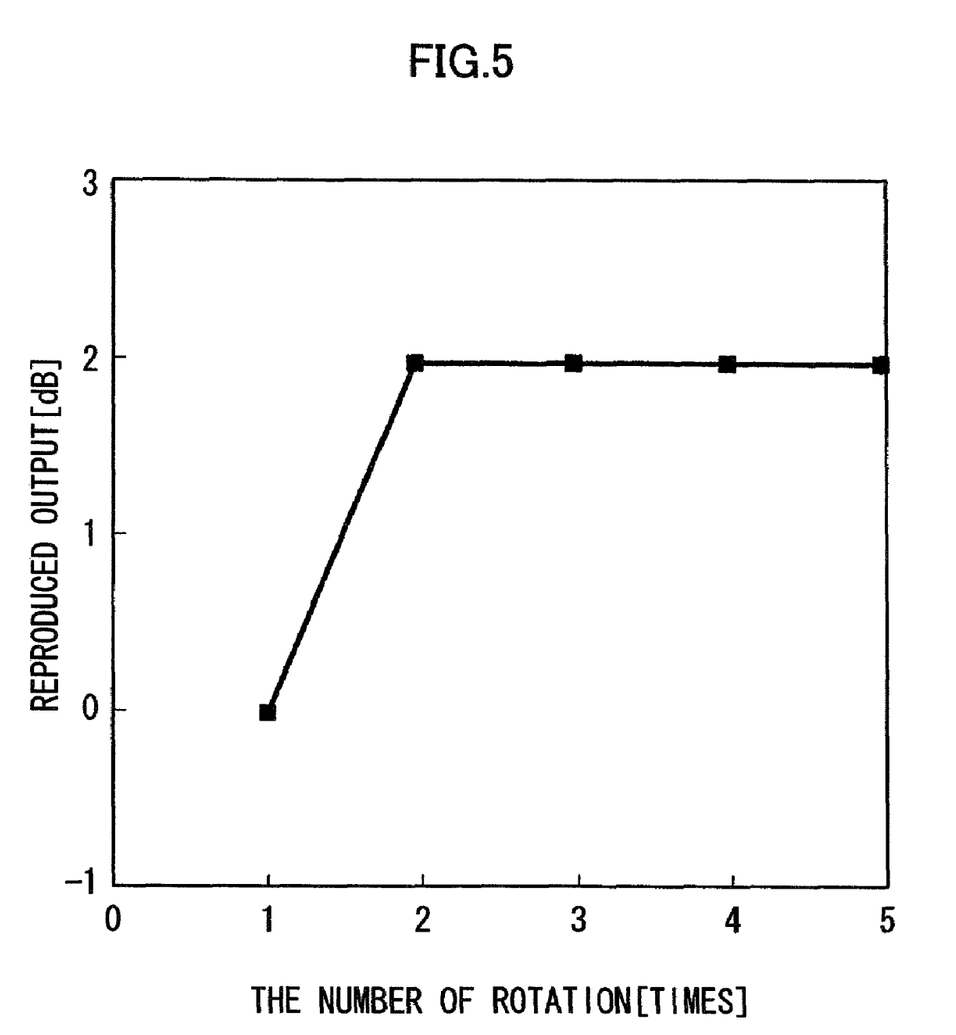
FIG. 5 is a graph illustrating the number of rotation of a magnetic field application device and reproduction characteristics of transferred information.

FIG. 5 shows, for the magnetic transfer disk 40 to which information is transferred from the master disk 46 according to the transfer method described above, relationship between the number of rotation of the magnetic field application device 30 and reproduction characteristics when magnetic information transferred to the magnetic transfer disk 40 is reproduced.

In addition, strength of the regenerative signal magnetically transferred was measured using electromagnetic conversion characteristic measuring equipment (LS-90 manufactured by Kyodo Denshi System Co., Ltd.). At this time, for heads, an MR head having a playback head gap of 0.06 μm and a playback track width of 0.14 μm, and a perpendicular head having a recording track width of 0.2 μm were used. A signal read in was resolved into frequencies by a spectral analyzer and peak strength of a primary signal was measured.

As shown in FIG. 5, a reference is set to 0 [dB], which is defined as the regenerative signal output of the magnetic transfer disk 40 when the number of rotation of the magnetic field application device 30 is one. From FIG. 5, two or more times of rotation of the magnetic field application device 30 increase the regenerative signal output by about 2 [dB]. Further, this regenerative signal output is approximately constant, independent of the number of rotation if it is two or more. Therefore, in order to provide the good regenerative signal output for magnetic information transferred to the magnetic transfer disk 40, it is necessary for the number of rotation of the magnetic field application device 30 to be two or more.

On the contrary, the regenerative signal output, which is based on magnetic information transferred to the magnetic transfer disk 40 independent of the number of rotation as far as it is two or more, is constant, and an increase in the number of rotation without reason provides no actual advantages, but it may decrease throughput, leading to an increase in costs. Then, from the view points of economical efficiency and mass productivity, it is desirable for the number of rotation to be as few as possible.

In order to rotate the magnetic field application device 30 across the surface of the magnetic transfer disk 40 by two or more times without fail, in consideration of effects caused by such as misalignment at a starting point and ending point of rotation of the magnetic field application device 30, and fluctuation in the magnetic field at the start and end of applying the magnetic field at these positions, it is desirable to rotate it by three or more times. As described above, considering productivity including economical efficiency, mass productivity, yield and throughput, in production, it is most desirable to rotate the magnetic field application device 30 by three times.

In addition, the regenerative signal output is high in the case of two or more rotations of the magnetic field application device 30 more than in the case of one rotation, and it is because, when the first rotation, the magnetization direction of the magnetic transfer disk 40 is oriented toward the direction opposing to the direction to be recorded, so that this magnetization direction of the magnetic transfer disk 40 affects the magnetization direction of the magnetic layer 48 of the master disk 46, and so the magnetization direction of the magnetic layer 40b of the magnetic transfer disk 40 may not be completely aligned, even if the transfer magnetic field Hd is applied, but once the magnetization direction of the magnetic layer 40b of the magnetic transfer disk 40 is aligned to some degree, the magnetization direction of the magnetic layer 40b of the magnetic transfer disk 40 has a decreased effect on the magnetization direction of the magnetic layer 48 of the master disk 46, and thereby, the magnetization direction which was not completely aligned by the first rotation can be completely aligned. Once the magnetization direction of the magnetic layer 40b of the magnetic transfer disk 40 is completely aligned along the record pattern of the master disk 46, the magnetization direction is not affected by any times of rotation afterward, so that an increase in the number of rotation may not change the regenerative signal output.

In addition, in the present embodiment, the magnetic field application device 30 has been described in connection with the electromagnet, but a permanent magnet which similarly produces a magnetic field may be used.

Further, in the present embodiment, the case of the edge print in which, in the magnetic transfer process, the magnetic transfer is carried out by applying the in-plane magnetic field has been described, but the description is applied to the case of the bit print in which the magnetic transfer is carried out by applying the perpendicular magnetic field upon the magnetic transfer. In this case, the magnetization direction of the magnetic transfer disk 40 is oriented toward the direction opposing to the direction to be recorded by initialization, and the magnetic field produced by this is opposed to the direction of the recording direction of the perpendicular magnetic field applied upon transfer, and therefore, application of the recording magnetic field may not completely align the magnetization direction of the magnetic layer 40b of the magnetic transfer disk 40, but once the magnetization direction of the magnetic layer 40b of the magnetic transfer disk 40 is aligned to some degree, the magnetization direction of the magnetic layer 40b of the magnetic transfer disk 40 has a decreased effect on the magnetization direction of the magnetic layer 48 of the master disk 46, and thereby, the magnetization direction which was not completely aligned by the first rotation can be completely aligned.

Second Embodiment

A second embodiment is a manufacturing method for forming the master disk 46 by a photofabrication method etc. In the present invention, the master disk 46 has the magnetic layer 48 formed on a substrate 47 composed of nonmagnetic material, corresponding to information to be transferred magnetically.

The present embodiment will be described with reference to FIGS. 6A to 6E.

Figure 6A:
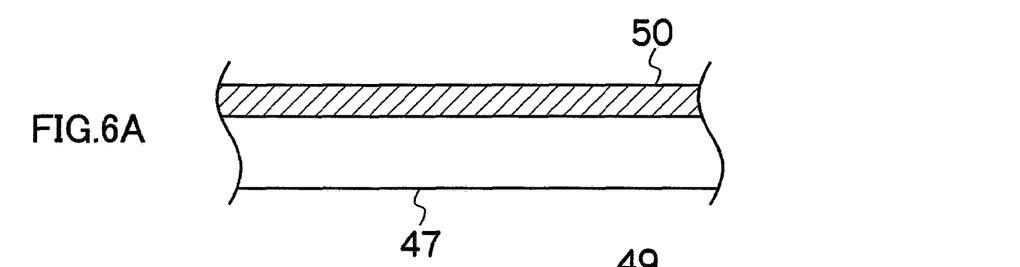
FIGS. 6A to 6E are process drawings illustrating a formation method of a master disk according to a second embodiment of the present invention.

As shown in FIG. 6A, a magnetic layer 50 is formed on the substrate 47 composed of nonmagnetic material such as glass. A manufacturing method of the magnetic layer 50 is the sputtering method etc. The magnetic layer 50 is composed of soft magnetic material, and is the same material as that shown in the first embodiment.

Figure 6B:
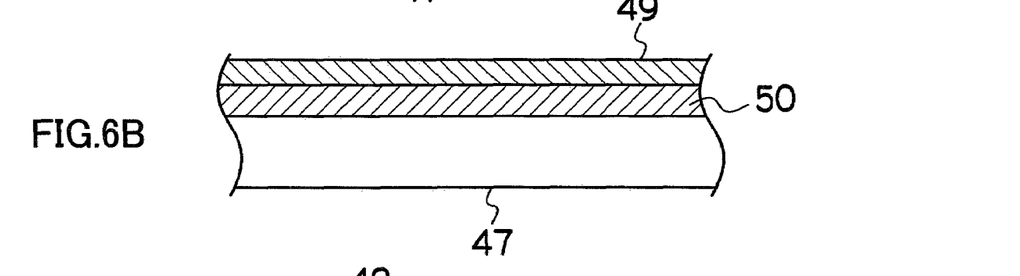

Next, as shown in FIG. 6B, a photoresist 49 is coated on a surface of the magnetic layer 50 which is formed on the substrate 47. The photoresist 49 is coated using a spin coater etc.

Figure 6C:
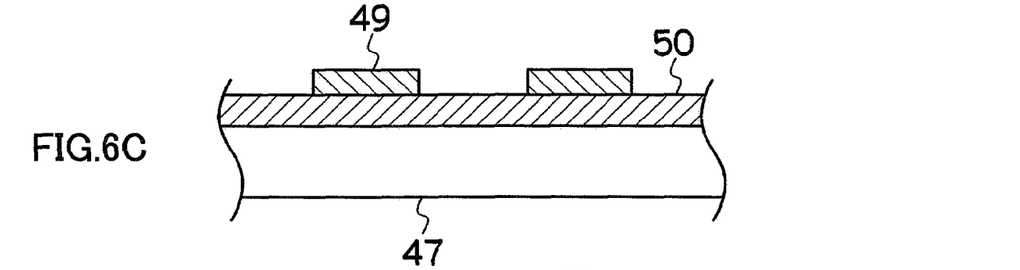

Subsequently, after prebaking, the master disk 46 is exposed and developed by exposure equipment so that the photoresist 49 is left behind only in an area where a magnetic layer is formed in the latter process. FIG. 6C shows this state.

Subsequently, for the surface of the photoresist 49 formed, the magnetic layer 50 is etched by RIE or the ion etching etc. Dry etching such as RIE or the ion etching is suitable for fine processing as the present embodiment, compared to wet etching.

Figure 6D:
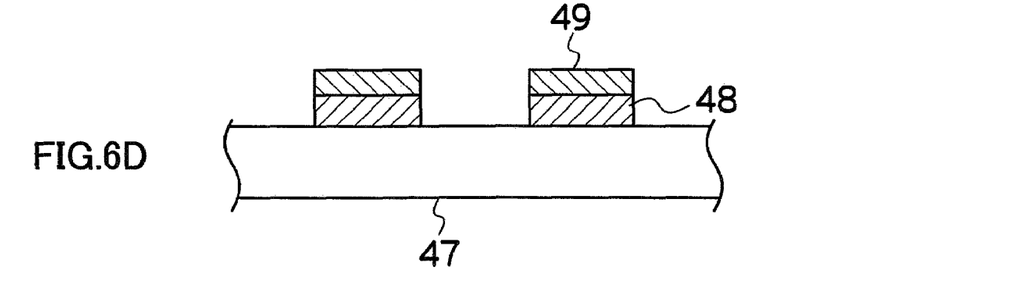

This etching is performed until the surface of the substrate 47 is exposed, as shown in FIG. 6D.

Figure 6E:
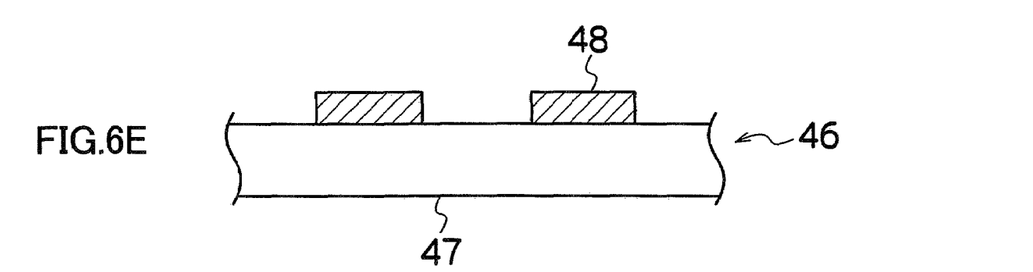

Subsequently, as shown in FIG. 6E, the master disk 46 provided with the magnetic layer 48 corresponding to information to be transferred on the substrate 47 is completed by immersing in organic solution or the like to remove the photoresist 49.

Figure 7A:
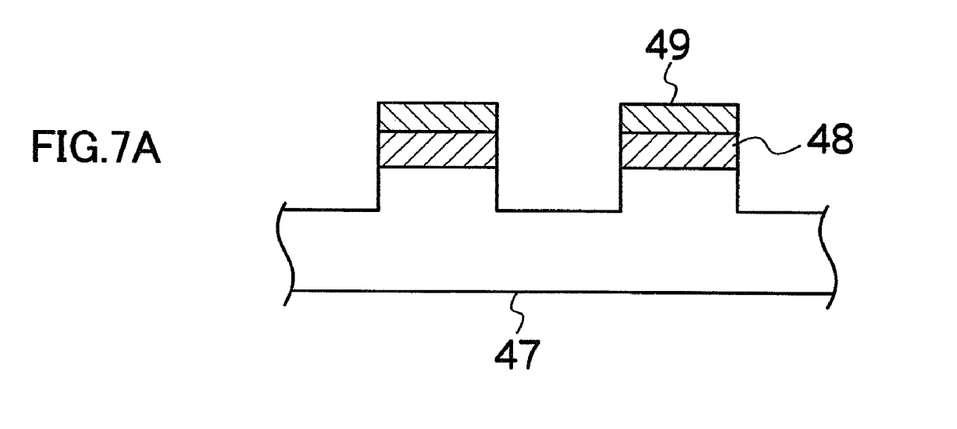
FIGS. 7A and 7B are process drawings illustrating another formation method of a master disk according to the second embodiment of the present invention.
Figure 7B:
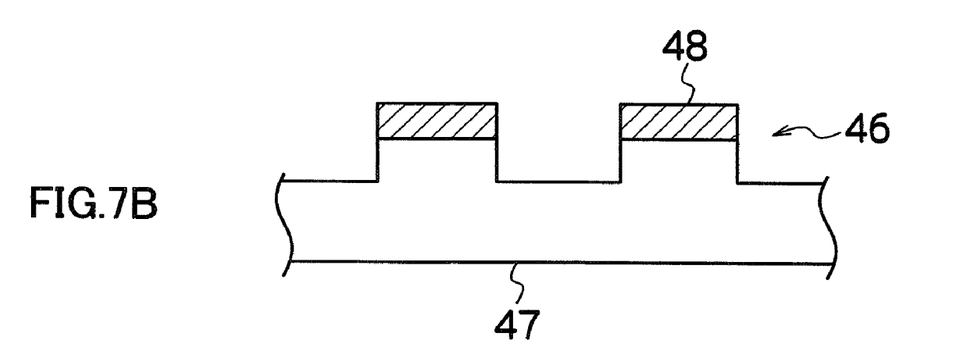

In addition, in the dry etching process in FIG. 6D, after the surface of the substrate 47 is exposed, the master disk 46 in which the magnetic layer 48 is formed on an upper surface of the projecting pattern on the substrate 47 as shown in FIG. 7B, is completed by further etching until the substrate 47 is etched up to some degree as shown in FIG. 7A, and by removing the photoresist 49 using organic solution etc. The master disk 46 provided in this way has the same shape as that in the first embodiment shown in FIG. 3E, and also can be formed using the method described above.

Next, another manufacturing method of the master disk 46 will be described with reference to FIGS. 8A to 8C.

Figure 8A:
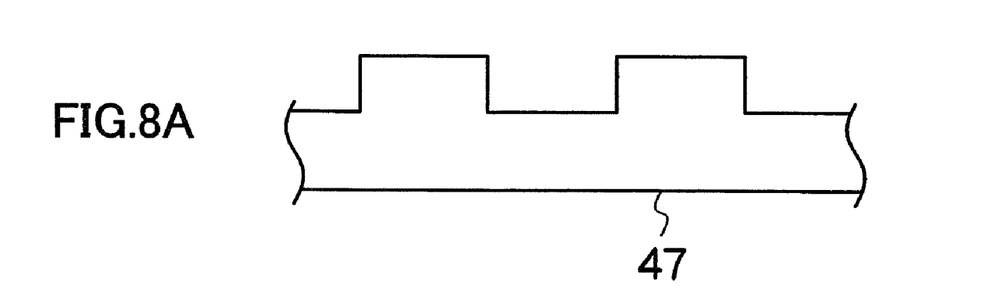
FIGS. 8A to 8C are process drawings illustrating a further formation method of a master disk according to the second embodiment of the present invention.
Figure 8B:
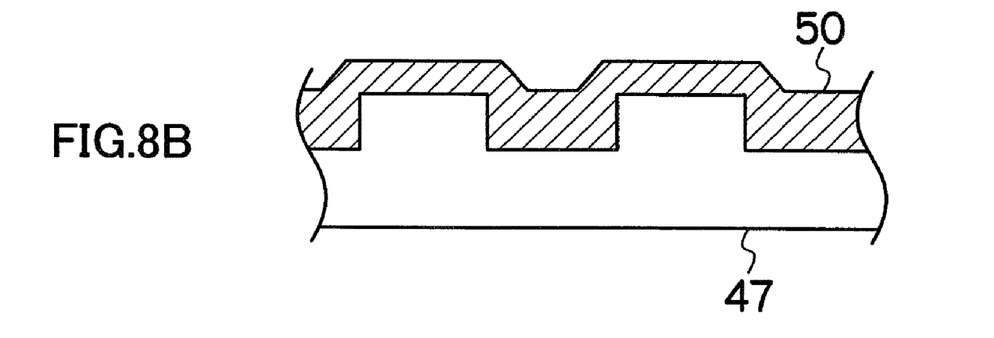
Figure 8C:
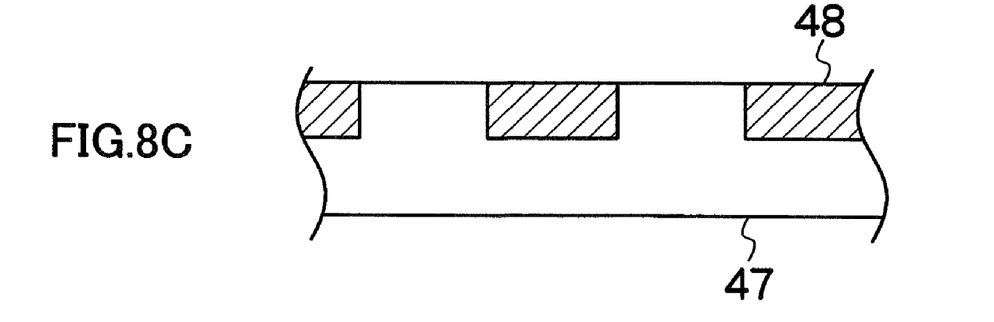

On the substrate 47 having a concavo-convex pattern formed thereon as shown in FIG. 8A, the magnetic layer 50 is formed entirely. FIG. 8B shows the magnetic layer 50 after formation. A specific manufacturing method of the magnetic layer 48 is the sputtering method etc.

Subsequently, it is processed by CMP (Chemical Mechanical Polishing) etc. until a convex portion on the surface of the substrate 47 is exposed. Accordingly, as shown in FIG. 8C, the master disk 46 in which the magnetic layer 48 is buried into the substrate 47 is completed.

Figure 9A:
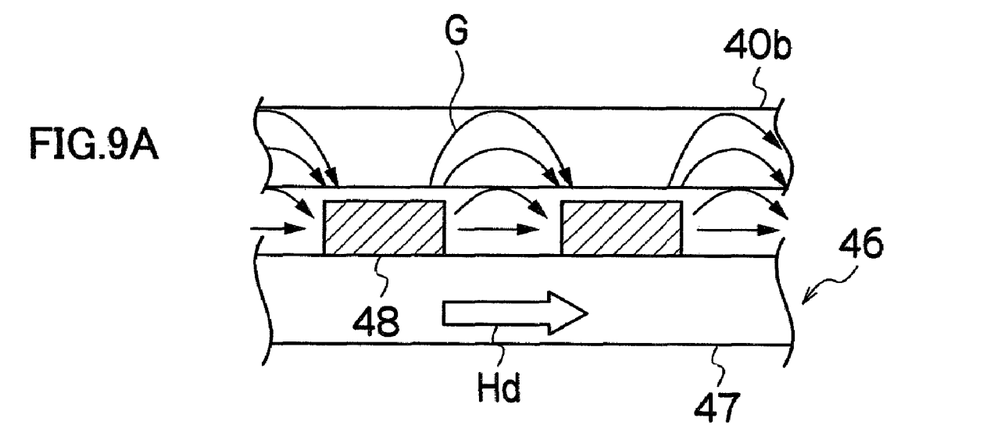
FIGS. 9A and 9B are explanatory drawings illustrating magnetic transfer using a master disk formed according to the second embodiment of the present invention.
Figure 9B:
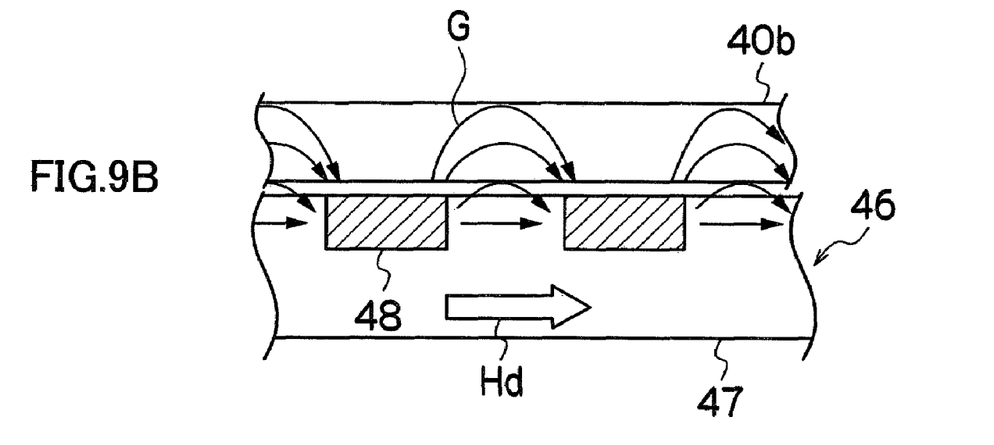

FIGS. 9A and 9B show a state in that the recording magnetic field Hd is applied to the master disk 46 manufactured according to the processes described above. FIG. 9A shows the state in the case of using the master disk 46 manufactured according to FIG. 6, and FIG. 9B shows the state in the case of using the master disk 46 manufactured according to FIG. 8.

In both cases, because the substrate 47 is formed of non-magnetic material, application of the recording magnetic field Hd produces a leakage magnetic field from the magnetic layer 48, and then, by magnetic flux G due to this, the magnetic transfer to the magnetic layer 40b of the magnetic transfer disk 40 is performed.

The magnetic transfer disk 40 to which information is magnetically transferred from the master disk 46 is built into a magnetic recording system such as a hard disk to be used. Specifically, it is built into a hard disk drive currently available to be used. Therefore, a magnetic recording system having a high recording density can be provided.

So far, the magnetic transfer method, the magnetic transfer apparatus, the magnetic recording medium and the magnetic record reproduction system according to the present invention have been described in detail, but the present invention is not limited to the examples described above and various improvements and modifications may be made thereto without departing from the spirits of the present invention.

What is claimed is:

1. A magnetic transfer method comprising:
an adhesion process which adheres a side having a perpendicular magnetic recording layer of a perpendicular magnetic recording medium in which a perpendicular magnetic recording layer is formed on a surface of a disk shaped substrate, to a surface of a master recording medium in which a magnetic layer is formed corresponding to information to be recorded for transferring information to the perpendicular magnetic recording medium and of the side having the magnetic layer formed, and
a magnetic transfer process which performs magnetic transfer by relatively rotating a magnetic field application device about the center of the perpendicular magnetic recording medium as an axis with respect to the perpendicular magnetic recording medium and the master recording medium adhered with each other, while applying a magnetic field to the perpendicular magnetic recording medium and the master recording medium adhered with each other by the magnetic field application device which applies the magnetic field, wherein
the magnetic field application device is relatively rotated two or more times with respect to the perpendicular magnetic recording medium and the master recording medium adhered with each other.

2. The magnetic transfer method according to claim 1, wherein
the master recording medium has a magnetic layer formed on a substrate composed of nonmagnetic material.

3. The magnetic transfer method according to claim 1, wherein
in the master recording medium, an area where the magnetic layer is formed has a projecting shape.

4. The magnetic transfer method according to claim 1, wherein
when a magnetic field is applied to the perpendicular magnetic recording medium and the master recording medium adhered with each other by the magnetic field application device, the magnetic field application device is disposed on the side of the master recording medium and applies the magnetic field from the side of the master recording medium.

5. The magnetic transfer method according to claim 1, wherein
the number of rotation is three when the magnetic field application device is relatively rotated, while the magnetic field is applied by the magnetic field application device, with respect to the perpendicular magnetic recording medium and the master recording medium adhered with each other.

6. The magnetic transfer method according to claim 1, wherein
an information to be transferred from the master recording medium to the perpendicular magnetic recording medium is of a servo signal.

7. A perpendicular magnetic recording medium, wherein magnetic transfer is performed by the magnetic transfer method according to claim 1.

8. A magnetic record reproduction system comprising the perpendicular magnetic recording medium in which magnetic transfer is performed by the magnetic transfer method according to claim 1.

9. A magnetic transfer method comprising:
an initial magnetization process which vertically magnetizes, in the same direction, a perpendicular magnetic recording medium in which a perpendicular magnetic recording layer is formed on a surface of a disk substrate,
an adhesion process which adheres a surface of the perpendicular magnetic recording medium initially magnetized by the initial magnetization process and of the side having the perpendicular magnetic recording layer formed, to a surface of a master recording medium in which a magnetic layer is formed corresponding to information to be recorded for transferring information to the perpendicular magnetic recording medium and of the side having the magnetic layer formed, and
a magnetic transfer process which performs magnetic transfer by relatively rotating a magnetic field application device about the center of the perpendicular magnetic recording medium as an axis with respect to the perpendicular magnetic recording medium and the master recording medium adhered with each other, while applying a magnetic field to the perpendicular magnetic recording medium and the master recording medium adhered with each other by the magnetic field application device which applies the magnetic field, wherein the magnetic field application device is relatively rotated two or more times with respect to the perpendicular magnetic recording medium and the master recording medium adhered with each other.

10. The magnetic transfer method according to claim 9, wherein
the master recording medium has a magnetic layer formed on a substrate composed of nonmagnetic material.

11. The magnetic transfer method according to claim 9, wherein
in the master recording medium, an area where the magnetic layer is formed has a projecting shape.

12. The magnetic transfer method according to claim 9, wherein
when a magnetic field is applied to the perpendicular magnetic recording medium and the master recording medium adhered with each other by the magnetic field application device, the magnetic field application device is disposed on the side of the master recording medium and applies the magnetic field from the side of the master recording medium.

13. The magnetic transfer method according to claim 9, wherein
the number of rotation is three when the magnetic field application device is relatively rotated, while the magnetic field is applied by the magnetic field application device, with respect to the perpendicular magnetic recording medium and the master recording medium adhered with each other.

14. The magnetic transfer method according to claim 9, wherein
an information to be transferred from the master recording medium to the perpendicular magnetic recording medium is of a servo signal.

15. A perpendicular magnetic recording medium, wherein magnetic transfer is performed by the magnetic transfer method according to claim 9.

16. A magnetic record reproduction system comprising the perpendicular magnetic recording medium in which magnetic transfer is performed by the magnetic transfer method according to claim 9.

17. A magnetic transfer apparatus in which magnetic transfer is performed by adhering a surface of a perpendicular magnetic recording medium in which a perpendicular magnetic recording layer is formed on a surface of a disk substrate and of the side having the perpendicular magnetic recording layer formed, to a surface of a master recording medium in which a magnetic layer is formed corresponding to information to be recorded for transferring information to the perpendicular magnetic recording medium and of the side having the magnetic layer formed, and by relatively rotating a magnetic field application device about the center of the perpendicular magnetic recording medium as an axis with respect to the perpendicular magnetic recording medium and the master recording medium adhered with each other, while applying a magnetic field to the perpendicular magnetic recording medium and the master recording medium adhered with each other by the magnetic field application device which applies the magnetic field, wherein
the magnetic transfer apparatus has a rotating device which relatively rotates the magnetic field application device two or more times with respect to the perpendicular magnetic recording medium and the master recording medium adhered with each other.

* * * * *